United States Patent [19]

Radtke et al.

[11] Patent Number: 4,491,544
[45] Date of Patent: Jan. 1, 1985

[54] DYES HAVING A DIAZO COMPONENT AND AN ISOQUINOLINE COUPLING COMPONENT

[75] Inventors: Volker Radtke, Hassloch; Heinrich Kowarsch, Oberderdingen; Erwin Hahn, Heidelberg; Peter Hauser, Limburgerhof, all of Fed. Rep. of Germany

[73] Assignee: BASF Aktiengesellschaft, Ludwigshafen, Fed. Rep. of Germany

[21] Appl. No.: 409,144

[22] Filed: Aug. 18, 1982

[30] Foreign Application Priority Data

Sep. 5, 1981 [DE] Fed. Rep. of Germany ....... 3135330

[51] Int. Cl.³ .................. C09B 1/20; C09B 29/00; C09B 29/033; C09B 29/42
[52] U.S. Cl. .................. 534/655; 106/23; 106/288 Q; 106/308 Q; 546/142; 534/756; 534/757; 534/768; 534/772
[58] Field of Search ................ 260/155

[56] References Cited

U.S. PATENT DOCUMENTS 3,849,393 11/1974 Corby et al. .................. 260/155
4,315,855 2/1982 Schefczik .................. 260/155

FOREIGN PATENT DOCUMENTS 2130990 12/1971 Fed. Rep. of Germany ...... 260/155
2130991 12/1971 Fed. Rep. of Germany ...... 260/155
2145028 2/1979 Fed. Rep. of Germany ...... 260/155

*Primary Examiner*—Floyd D. Higel
*Attorney, Agent, or Firm*—Oblon, Fisher, Spivak, McClelland & Maier

[57] ABSTRACT

A compound having the formula (I):

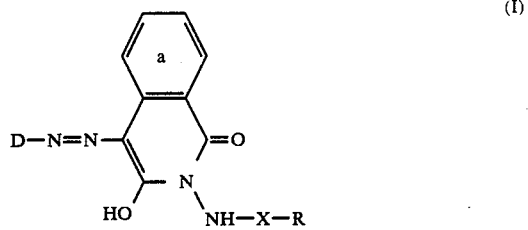

wherein D is a radical of a heterocyclic or aromatic component selected from the group of aniline, anthraquinone, phthalimide or aminobenzene radicals, wherein the radical is unsubstituted or is substituted by fluorine, chlorine, bromine, nitro, $C_1$-$C_4$-alkyl, $C_1$-$C_4$-alkoxy, trifluoromethyl, cyano, $C_1$-$C_4$-alkylsulfonyl, carboxylic acid ester groups, carbamyl, sulfamyl, 1,3,4- or 1,2,4-oxadiazolyl or acylamino groups; X is CO— or —$SO_2$—; and R is an aliphatic, aromatic or heterocyclic radical selected from the group of $C_1$-$C_{20}$ alkyl which is unsubstituted or is substituted by chlorine, bromine, cyano or dialkylamino groups; or phenyl or methyl groups unsubstituted or substituted by fluorine, bromine, methyl, ethyl, methoxy, ethoxy, cyano, carbamyl, sulfamyl or acylamino groups; or amino group; or a radical of the formula:

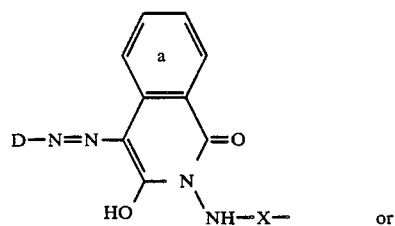

or

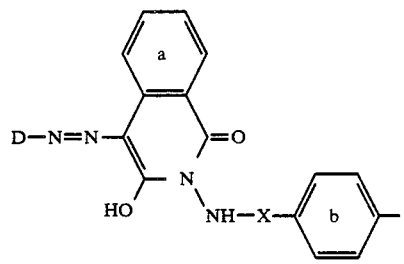

wherein ring a is unsubstituted or is substituted by nitro, fluro, bromine or methoxy groups; and ring b is unsubstituted or is substituted by chlorine, bromine or nitro groups.

The majority of the compounds of the formula (I) have yellow hues and are used as pigments in printing inks and finishes, and as disperse dyes for synthetic fibers.

3 Claims, No Drawings

DYES HAVING A DIAZO COMPONENT AND AN ISOQUINOLINE COUPLING COMPONENT

The present invention relates to compounds of the general formula I

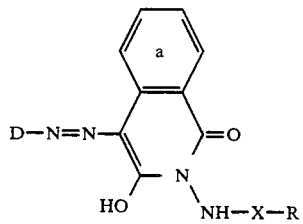

where D is a radical of a diazo component, X is CO or $SO_2$ and R is an aliphatic, aromatic or heterocyclic radical, an unsubstituted or substituted amino group, or a radical of the formula

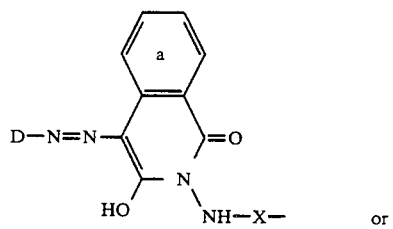

or

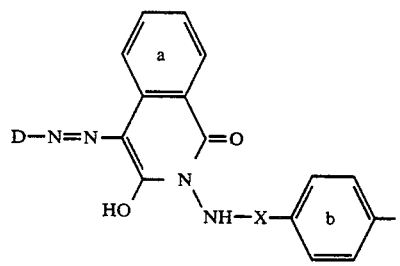

and the rings a and b may furthermore be substituted.

The radicals D are derived from heterocyclic or, in the main, aromatic diazo components, for example those of the aniline, anthraquinone, phthalimide or aminoazobenzene series. The diazo components may carry the substituents usually present in water-insoluble dyes, eg. fluorine, chlorine, bromine, nitro, $C_1$–$C_4$-alkyl, $C_1$–$C_4$-alkoxy, trifluoromethyl, cyano, $C_1$–$C_4$-alkylsulfonyl, carboxylic acid ester groups, unsubstituted or substituted carbamyl or sulfamyl, unsubstituted or substituted 1,3,4- or 1,2,4-oxadiazolyl or acylamino.

Specific examples of substituents, in addition to those stated above, are $CH_3$, $C_2H_5$, $C_3H_7$, $C_4H_9$, $OCH_3$, $OC_2H_5$, $OC_4H_9$, $CH_3SO_2$, $C_2H_5SO_2$, $C_3H_7SO_2$, $COOCH_3$, $COOC_2H_5$, $COOC_6H_5$,

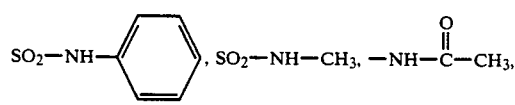

-continued

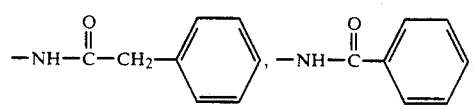

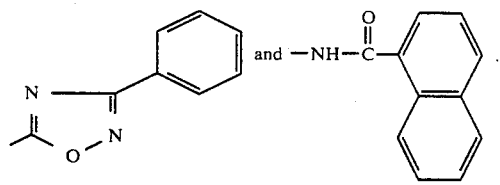

Specific examples of important diazo components are o-nitroaniline, p-chloro-o-nitroaniline, p-methoxy-o-nitroaniline, p-aminoazobenzene, 2,5-dichloroaniline, methyl anthranilate and 1-aminoanthraquinone.

R is, for example, $C_1$–$C_{20}$-alkyl which may furthermore be substituted by chlorine, bromine, cyano or dialkylamino, but is preferably naphthyl or phenyl which is substituted by fluorine, chlorine, bromine, methyl, ethyl, methoxy, ethoxy, cyano, unsubstituted or substituted carbamyl, sulfamyl or acylamino.

Typical examples of heterocyclic radicals R are:

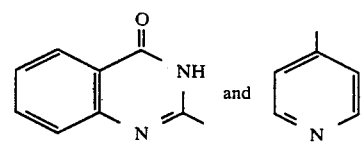

Specific examples of radicals R are methyl, ethyl, p-chlorophenyl, benzyl, m-nitrophenyl,

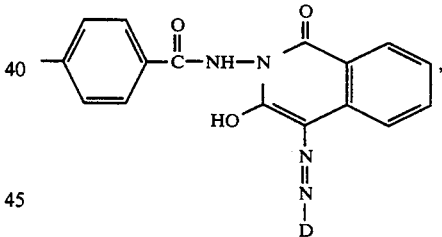

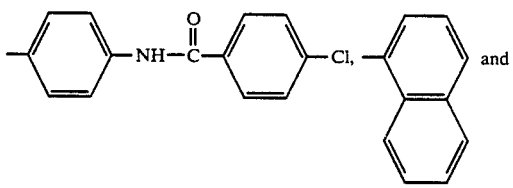

The ring a may, for example, furthermore be substituted by nitro, chlorine, bromine or methoxy, and the ring b may be substituted by chlorine, bromine or nitro.

To prepare the compounds of the formula I, a diazonium compound of an amine of the formula

D—$NH_2$ is reacted with a coupling component of the formula II

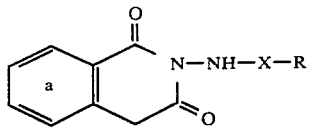

The diazotization and coupling are carried out in a conventional manner.

The Examples which follow illustrate the preparation. Parts and percentages are by weight, unless stated otherwise.

Some of the compounds of the formula II, and the preparation of these, have been disclosed in the literature, for example in Bull. Chem. Soc. Jap. 48 (1975), 2915 and J. Heterocycl. Chem. 6 (1969), 9.

Novel compounds of the formula II may be prepared by a similar method.

The majority of the compounds of the formula I have yellow hues and, depending on their solubilities, are mainly used as pigments in printing inks and finishes, and as disperse dyes for synthetic fibers, such as polyesters.

Compounds of the formula I a

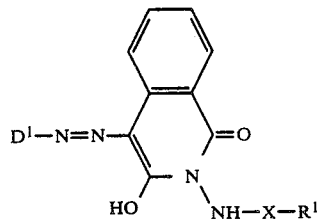

where $D^1$ is 1-anthraquinoyl or phenyl which is unsubstituted or substituted by chlorine, bromine, nitro or methoxy, $R^1$ is methyl or is phenyl which is unsubstituted or substituted by chlorine, bromine or benzoylamino and X has the stated meanings, are particularly important.

EXAMPLE 1

13.8 parts of o-nitroaniline in 35 parts of water and 25 parts by volume of 32% strength hydrochloric acid are stirred overnight at room temperature. The mixture is then made up to 270 parts by volume with ice-water, and 32 parts of 23% strength sodium nitrite solution are added rapidly at 0° C. Stirring is continued for two hours, after which the excess nitrite is destroyed with amidosulfonic acid and the mixture is filtered.

A mixture of 28 parts of the coupling component of the formula

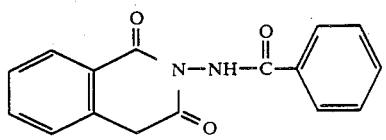

1,500 parts of water and 50 parts of 50% strength NaOH is poured into the above diazonium salt solution at 0° C., the pH of the mixture is brought to 4–5, and stirring is continued for 2 hours. The precipitate is filtered off under suction, washed with water and a little cold methanol, and dried, giving 36 parts of a yellow powder.

Other pigments are obtained when the diazo components given in the Table below are reacted with the coupling components listed in the same Table, the reaction being carried out as described in Example 1.

| Example | Diazo component | Coupling component | Hue |
|---|---|---|---|
| 2 | 4-Cl, 2-CH₃ aniline | benzoyl hydrazide isoindolinedione | reddish yellow |
| 3 | 2,5-dichloroaniline | " | very greenish yellow |
| 4 | 2,4,5-trichloroaniline | " | greenish yellow |
| 5 | 2-Cl, 4-NO₂ aniline | nitro-substituted benzoyl hydrazide isoindolinedione | yellow |

| Example | Diazo component | Coupling component | Hue |
|---|---|---|---|
| 6 | 4-chloro-2-nitroaniline | (phthalazinone hydrazide of 1-naphthoyl) | yellow |
| 7 | " | (phthalazinone hydrazide of 4-benzamidobenzoyl) | reddish yellow |
| 8 | " | (phthalazinone acetyl hydrazide) | reddish yellow |

EXAMPLE 9

138 parts of o-nitroaniline are dissolved in a mixture of 850 parts by volume of formic acid and 150 parts by volume of propionic acid, and 160 parts of nitrosylsulfuric acid are added dropwise in the course of about 1.5 hours, at 0°–5° C. Excess nitrite is destroyed with amidosulfonic acid.

The diazonium salt solution is then allowed to run into a filtered mixture of 316 parts of the coupling component of the formula

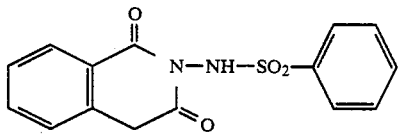

15,000 parts by volume of water and 500 parts by volume of 50% strength sodium hydroxide solution, at 0° C. The pH of the mixture is brought to 5–6 with NaOH, and stirring is continued for about one hour. The precipitate is filtered off under suction, washed salt-free with cold water and dried under reduced pressure at 60° C. 385 parts of a yellow powder are obtained in this manner.

Other pigments are obtained when the diazo components and coupling components given below are reacted as described in Example 9.

| Example | Diazo component | Coupling component | Hue |
|---|---|---|---|
| 10 | 4-methoxy-2-nitroaniline | (phthalazinone hydrazide of 4-chlorobenzoyl) | orange |
| 11 | methyl anthranilate | (phthalazinone hydrazide of phenylacetyl) | greenish yellow |
| 12 | 4-methyl-2-nitroaniline | (bis-phthalazinone oxalyl dihydrazide) | reddish yellow |

| Example | Diazo component | Coupling component | Hue |
|---|---|---|---|
| 13 | 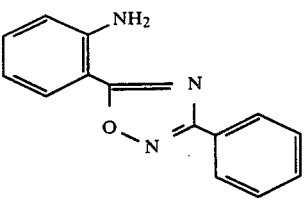 | 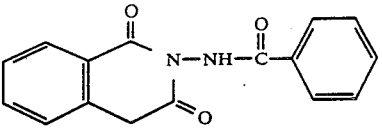 | very greenish yellow |
| 14 | 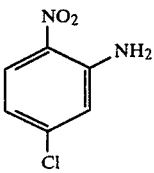 | 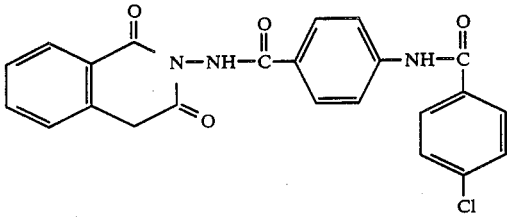 | yellow |

EXAMPLE 15

225 parts of 1-aminoanthraquinone are introduced into 1,250 parts of sulfonic acid monohydrate at about 30°–35° C., and the mixture is stirred for one hour (the suspension should no longer contain any crystalline aminoanthraquinone). Thereafter, the mixture is poured into 4,000 parts of ice and 1,000 parts of water, and 315 parts of 23% sodium nitrite solution are added dropwise at 0°–5° C. Stirring is continued for two hours, after which the mixture is filtered and excess nitrite is destroyed with amidosulfonic acid.

The diazonium salt solution is run into a mixture of 241 parts of the coupling component of the formula

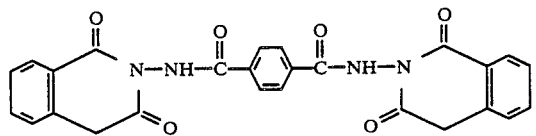

500 parts of 50% strength NaOH, 15,000 parts of water and 100 parts of sodium acetate, at 0°–5° C. The pH is kept at 6–7 by adding 50% strength sodium hydroxide solution. After about 1 hour, the mixture is heated to 90° C. by means of steam, and the product is filtered off under suction from the hot suspension, washed salt-free and dried. 365 parts of a red powder are obtained.

Other pigments are obtained when the diazo components given in the Table below are reacted with the coupling components given in the same Table, the reaction being carried out as described in Example 15.

| Example | Diazo component | Coupling component | Hue |
|---|---|---|---|
| 16 | 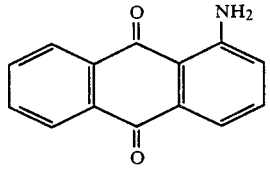 | 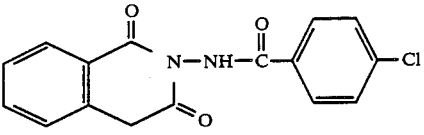 | orange |
| 17 | " | 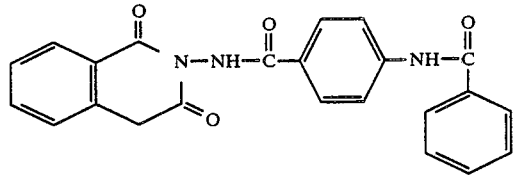 | orange |
| 18 | " | 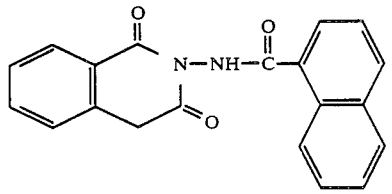 | yellowish orange |

| Example | Diazo component | Coupling component | Hue |
|---|---|---|---|
| 19 | " | [structure: phthalhydrazide-type with N—NH—CO—C(—)₂—CO—] | very reddish yellow |
| 20 | [structure: 5-amino-phthalimide] | [structure: phthalhydrazide N—NH—SO₂—phenyl] | reddish yellow |
| 21 | [structure: 2-nitro-4-bromo-5-acetamido-aniline] | [structure: phthalhydrazide N—NH—CO—phenyl] | yellow |
| 22 | [structure: 2-nitroaniline] | [structure: nitro-phthalhydrazide with N—NH—CO—C(—)₂—CO—] | yellow |
| 23 | " | [structure: phthalhydrazide N—NH—CO—NH₂] | yellow |
| 24 | " | [structure: phthalhydrazide N—NH—CO—NH—phenyl] | yellow |

EXAMPLE 25

Printing Ink 5 parts of the dye obtained in Example 1, 30–40 parts of resin (for example colophonium resin modified with phenol-formaldehyde) and 65 parts of toluene are mixed thoroughly in a disperser. The toluene-based standard yellow gravure printing ink obtained has good lightfastness and color strength.

We claim:

1. A compound of the formula:

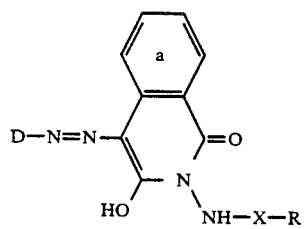

wherein D is a radical of a heterocyclic or aromatic component selected from the group consisting of aniline, anthraquinone, phthalimide or aminoazobenzene radicals, wherein said radical is unsubstituted or is substituted by fluorine, chlorine, bromine, nitro, $C_1$–$C_4$ alkyl, $C_1$–$C_4$ alkoxy, trifluoromethyl, cyano, $C_1$–$C_4$ alkylsulfonyl, carboxylic acid ester groups, carbamyl, sulfamyl, 1,3,4- or 1,2,4-oxadiazolyl or acylamino groups; X is —CO— or —SO₂—; and R is an aliphatic, aromatic or heterocyclic radical selected from the group consisting of $C_1$–$C_{20}$ alkyl which is unsubstituted or is substituted by chlorine, bromine, cyano, or dialkyl amino groups; or phenyl or naphthyl groups which are unsubstituted or substituted by fluorine, chlorine, bromine, methyl, ethyl, methoxy, ethoxy, cyano, carbamyl, sulfamyl or benzoylamino; or an amino group; or a radical of the formula:

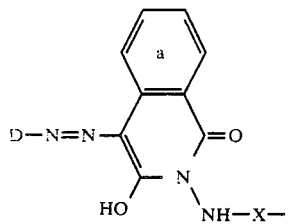

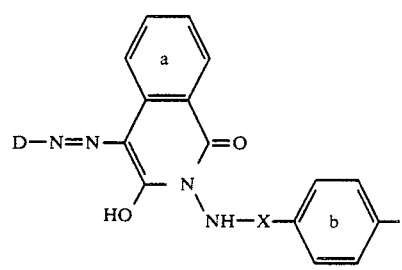

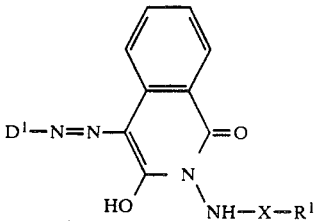

wherein ring a is unsubstituted or is substituted by nitro, chloro, bromine, or methoxy; and ring b is unsubstituted or is substituted by chlorine, bromine or nitro groups.

2. The compound of claim 1 having the formula, wherein said radical of a heterocyclic or aromatic component, D, is derived from o-nitroaniline, p-chlor-o-nitroaniline, p-methoxy-o-nitroaniline, p-aminoazobenzene, 2,5-dichloroaniline, methyl anthranilate and 1-aminoanthraquinone.

3. A compound of the formula:

wherein $D^1$ is 1-anthraquinoyl or phenyl which is unsubstituted or substituted by chlorine, bromine, nitro or methoxy; $R^1$ is methyl or phenyl which is unsubstituted or substituted by chlorine, bromine, benzoylamino; and X is —CO— or —SO$_2$—.

* * * * *